(12) United States Patent
Zhang et al.

(10) Patent No.: US 11,588,566 B2
(45) Date of Patent: Feb. 21, 2023

(54) SYSTEMS AND METHODS FOR TIMESTAMP SYNCHRONIZATION

(71) Applicant: Beijing (ZX) Pony. AI Technology Co., Ltd., Beijing (CN)

(72) Inventors: Chunlong Zhang, Beijing (CN); Lintao Li, Beijing (CN)

(73) Assignee: Beijing (ZX) Pony. AI Technology Co., Ltd., Beijing (CN)

( * ) Notice: Subject to any disclaimer, the term of this patent is extended or adjusted under 35 U.S.C. 154(b) by 0 days.

(21) Appl. No.: 17/103,325

(22) Filed: Nov. 24, 2020

(65) Prior Publication Data

US 2021/0159995 A1 May 27, 2021

(30) Foreign Application Priority Data

Nov. 26, 2019 (CN) .......................... 201911176834.7

(51) Int. Cl.
*H04J 3/06* (2006.01)

(52) U.S. Cl.
CPC .......... *H04J 3/0602* (2013.01); *H04J 3/0638* (2013.01)

(58) Field of Classification Search
CPC ............................... H04J 3/0602; H04J 3/0638
See application file for complete search history.

(56) References Cited

U.S. PATENT DOCUMENTS

| | | | |
|---|---|---|---|
| 6,483,856 B1 | 11/2002 | Bird | |
| 7,411,937 B2 | 8/2008 | Guilford | |
| 8,873,589 B2 | 10/2014 | Aweya et al. | |
| 10,285,141 B1* | 5/2019 | Carver | A61B 5/0015 |
| 2001/0034223 A1* | 10/2001 | Rieser | H04L 29/06 455/404.2 |
| 2002/0168988 A1* | 11/2002 | Younis | G01S 19/05 455/456.1 |
| 2007/0291678 A1* | 12/2007 | Chowdhury | H04M 17/02 370/328 |
| 2011/0158120 A1* | 6/2011 | Hamasaki | H04J 3/0688 370/252 |
| 2013/0295912 A1* | 11/2013 | Chen | H04W 4/44 455/420 |
| 2015/0084766 A1* | 3/2015 | Cordaro | H04W 4/90 340/521 |
| 2016/0095092 A1* | 3/2016 | Khoryaev | H04W 64/00 370/329 |
| 2016/0187458 A1* | 6/2016 | Shah | G01S 5/021 455/456.1 |
| 2017/0217446 A1* | 8/2017 | Halder | G05D 1/021 |
| 2017/0255803 A1* | 9/2017 | Yoscovich | H02S 50/00 |
| 2018/0075728 A1* | 3/2018 | Liu | G08B 21/14 |
| 2018/0270042 A1* | 9/2018 | Yang | H04J 3/0638 |
| 2018/0310133 A1* | 10/2018 | Ramasamy | H04W 64/003 |
| 2019/0236058 A1* | 8/2019 | Komala | G06F 16/2477 |
| 2019/0266893 A1* | 8/2019 | Sambo | G08G 1/20 |
| 2019/0317507 A1* | 10/2019 | Zhang | G05D 1/0214 |
| 2020/0017117 A1* | 1/2020 | Milton | B60W 50/02 |
| 2020/0111011 A1* | 4/2020 | Viswanathan | G01C 21/005 |

\* cited by examiner

*Primary Examiner* — Huy D Vu
*Assistant Examiner* — Bailor C Hsu

(57) ABSTRACT

Described herein are systems, methods, and non-transitory computer-readable media configured to determine times embedded in a plurality of signals. A time deviation is detected based on the times embedded in the plurality of signals. In response, signal strengths associated with the plurality of signals are determined. Data is timestamped based on time embedded a signal that has a highest signal strength.

19 Claims, 5 Drawing Sheets

SYSTEMS AND METHODS FOR TIMESTAMP SYNCHRONIZATION

CROSS-REFERENCE TO RELATED APPLICATION

This application claims priority to China Patent Application No. 201911176834.7, filed Nov. 26, 2019, the content of which is hereby incorporated in its entirety.

BACKGROUND

Various data such as sensor data, navigation data, and communication data of autonomous or semi-autonomous vehicles can have disparate timestamps. For example, point cloud data from a light detection and ranging (LiDAR) sensor associated with a vehicle may be synchronized to a local time source to timestamp the point cloud data and location data received by the vehicle may be timestamped based on time sources associated with navigation satellites from which the location data is generated. In this example, the point cloud data and the location data may have been received by the autonomous vehicle at the same time, however, the respective timestamps embedded in the point cloud data and the location data may indicate that times at which the vehicle received the point cloud and the location data are different. Disparate timestamps may cause data access issues or problems.

SUMMARY

Described herein, in various embodiments, are systems, methods, and non-transitory computer-readable media configured to determine times embedded in a plurality of signals. A time deviation can be detected based on the times embedded in the plurality of signals. In response, signal strengths associated with the plurality of signals can be determined. Data can be timestamped based on time embedded in a signal that has a highest signal strength.

In some embodiments, the computing system can be associated with a vehicle such as an autonomous vehicle. The plurality of signals can be associated with global navigation satellite system (GNSS) signals. The data can be sensor data associated with the vehicle.

In some embodiments, the GNSS signals can comprise one or more of: a global positioning system (GPS) signal, a BeiDou Navigation Satellite System (BDS) signal, a Global Navigation Satellite System (GLONASS) signal, or a Galileo signal.

In some embodiments, the sensor data associated with the vehicle can include at least one of point cloud data from a light detection and ranging (LiDAR) sensor, image data from one or more cameras, object distance data from one or more radars, or acceleration and gyroscopic data from an inertial measurement unit.

In some embodiments, one or more time differences between the times embedded in the plurality of signals can be computed. The one or more time differences can be compared to a time threshold. The time deviation can be determined based on at least one of the one or more time differences exceeding the time threshold.

In some embodiments, an indication of the time deviation can be provided through a user interface. An indication of a signal with which time embedded in the signal is used to timestamp the data can be provided through the user interface.

In some embodiments, the signal that has the highest signal strength can exceed a threshold signal strength value.

In some embodiments, in response to the signal that has the highest signal strength not exceeding the threshold signal value, the data can be timestamped with time provided by a time server.

In some embodiments, the time provided by the time server can be accessed over a communication network.

In some embodiments, in response to the communication network not being available, the data can be timestamped with time provided by a local computing device. The local computing device can be a part of the computing system.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
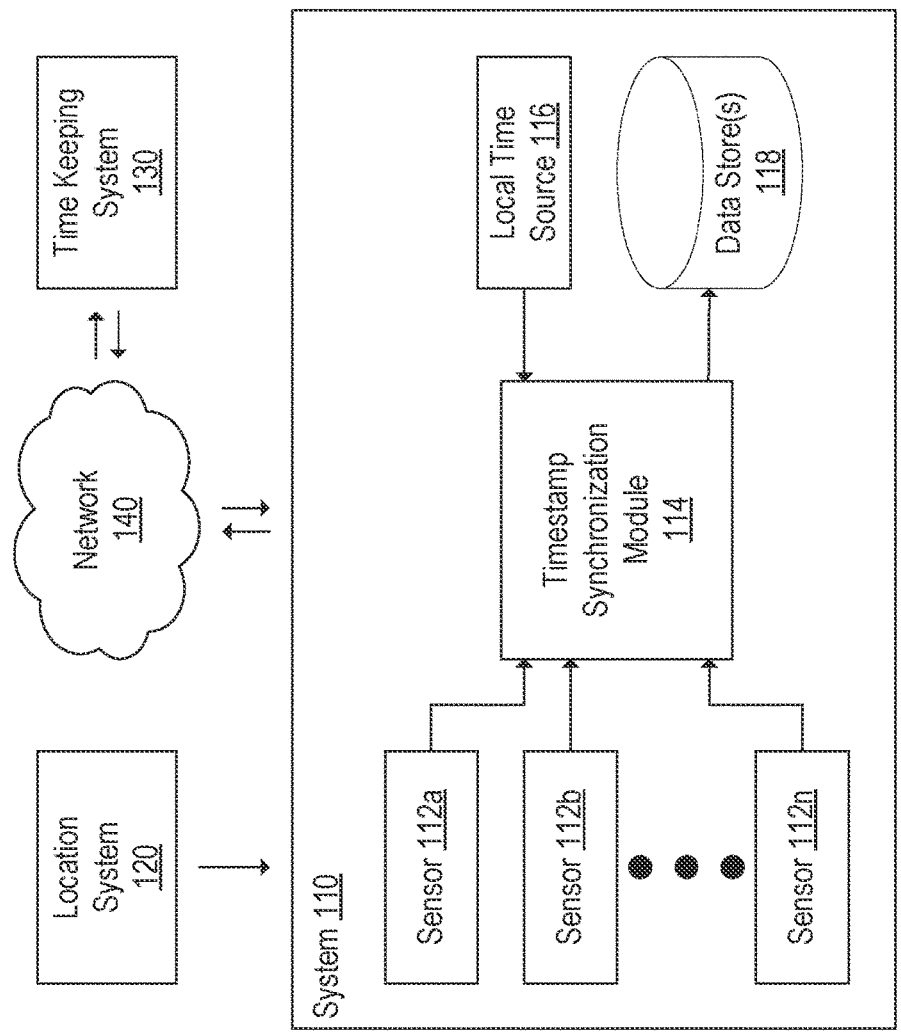
FIG. 1 illustrates an example timestamp synchronization architecture, in accordance with various embodiments of the present disclosure.

Various data such as sensor data, navigation data, and communication data of autonomous or semi-autonomous vehicles can have disparate timestamps. For example, point cloud data from a light detection and ranging (LiDAR) sensor associated with a vehicle may be synchronized to a local time source to timestamp the point cloud data and location data received by the vehicle may be timestamped based on time sources associated with navigation satellites from which the location data is generated. In this example, the point cloud data and the location data may have been received by the vehicle at the same time, however, the respective timestamps embedded in the point cloud data and the location data may indicate that times at which the vehicle received the point cloud data and the location data are different. Disparate timestamps may cause data access issues or problems. For example, various data associated with an autonomous vehicle may be integrated (e.g., arranged, organized, etc.) temporally based on timestamps to store the data for later access. If the timestamps in the data are not synchronized to a single time source (e.g., timestamps are off), it would be very difficult to reconstruct various attributes of the autonomous vehicle at a particular time in the past reliably and accurately.

Described herein is a solution that addresses the problems described above. In various embodiments, a system such as an autonomous or semi-autonomous vehicle can include a timestamp synchronization module. The timestamp synchronization module can be configured to timestamp data of the system based on time from a single time source. For example, the timestamp synchronization module can timestamp sensor data of a vehicle based on time embedded in location data provided by global navigation satellite system (GNSS). In some embodiments, the timestamp synchronization module can timestamp the data of the system based on time provided by a time server through a communication network. In some embodiments, the timestamp synchronization module can timestamp the data of the system based on time provided by a local computing device on-board the system.

In some embodiments, the timestamp synchronization module can detect a time deviation between times embedded in location data provided by a plurality of GNSS signals. For example, times embedded in a global positioning system (GPS) signal and a BeiDou Navigation Satellite System (BDS) signal can be extracted by the timestamp synchronization module. In this example, timestamp synchronization module can compare the two times and determine a time deviation when a difference between the two times exceeds a time threshold. In some embodiments, in response to determining the time deviation in the plurality of GNSS signals, the timestamp synchronization module can determine signal strengths of the plurality of GNSS signals and timestamp the data of the system based on time embedded in location data provided by a GNSS signal that has a highest signal strength.

In some embodiments, the timestamp synchronization module can timestamp the data of the system based on a hierarchy. For example, when a plurality of GNSS signals exceeds a threshold signal strength value, the timestamp synchronization module can be configured to timestamp data based on times embedded in location data provided by the plurality of GNSS signals. When the plurality of GNSS signals does not exceed the threshold signal strength value, the plurality of GNSS signals is deemed to be not reliable in timestamping data, and instead, the timestamp synchronization module can be configured to timestamp the data of the system based on time provided by a time server over a communication network. When the plurality of GNSS signals does not exceed the threshold signal strength value and the communication network with which to access the time server is not available, the timestamp synchronization module can be configured to timestamp the data of the system based on time provided by a local computing device of the system. These and other features of the timestamp synchronization module will be discussed in detail herein.

FIG. 1 illustrates an example timestamp synchronization architecture 100, in accordance with various embodiments of the present disclosure. As shown in FIG. 1, in some embodiments, timestamp synchronization architecture 100 can comprise a system 110 such as an autonomous or semi-autonomous vehicle. The system 110 can be configured to receive location data indicating a location of the system 110 from a location system 120. In some embodiments, the system 110 can be configured to be communicatively coupled or connected to a time keeping system 130 over a network 140. In various embodiments, the network 140 can be a cellular network such as a third generation (3G) or a fourth generation (4G) cellular network, or any other suitable wireless networks such as IEEE 802.11b (Wi-Fi) or 802.15 (Bluetooth) standards. Through the network 140, the system 110 can transmit and/or receive data relating to time to and/or from the time keeping system 130.

In some embodiments, the system 110 can comprise a plurality of sensors 112a-112n coupled or connected to a timestamp synchronization module 114 and a local time source 116. The plurality of sensors 112a-112n, in some embodiments, can include a LiDAR sensor that provides point cloud data of an environment, one or more cameras that provide image data of an environment, one or more radars that provide object distance data of an environments, and an inertial measurement unit (IMU) that provides acceleration, gyroscopic, and sometimes magnetic data associated with the system 110, for example. In some embodiments, the timestamp synchronization module 114 can be configured to timestamp data captured or acquired by the plurality of sensors 112a-112n. For example, the timestamp synchronization module 114 can timestamp the point cloud data acquired by the LiDAR. As another example, the timestamp synchronization module 114 can timestamp the image data captured by the one or more cameras. The timestamp synchronization module 114 can timestamp the data captured or acquired by the plurality of sensors 112a-112n based on the local time source 116. For example, the local time source 116 may be an internal time clock associated with a computing device on-board the system 110 and the timestamp synchronization module 114 can use time provided by the computing device to timestamp the data captured or acquired by the plurality of sensors 112a-112n. In some embodiments, the timestamp synchronization module 114 can timestamp the data captured or acquired by the plurality of sensors 112a-112n based on other time sources. For example, in some embodiments, the timestamp synchronization module 114 can timestamp data based on time provided by the location system 120. As another example, the timestamp synchronization module 114 can timestamp data based on time provided by the time keeping system 130. In some embodiments, the timestamp synchronization module 114 can integrate (e.g., organize, arrange, etc.) the data captured or acquired by the plurality of sensors 112a-112n and store the data into one or more datastores 118. The data stored in the one or more data stores 118, in some embodiments, may be accessed by the system 110, in or near real-time, to make decisions. For example, timestamped point cloud data stored in the one or more datastore 118 can be accessed by an autonomous vehicle to identify objects and/or roads in order to make driving decisions such as accelerating, decelerating, turning, etc. In some cases, the data stored in the one or more data stores 118 can be transmitted to other computing devices over the network 140. The timestamp synchronization module 114 will be discussed in further detail in reference to FIG. 2 herein.

In some embodiments, the location system 120 can comprise global navigation satellite system (GNSS) that provides location data to the system 110. GNSS can comprise one or more of satellite networks such as Global Positioning System (GPS), BeiDou Navigation Satellite System (BDS), Global Navigation Satellite System (GLONASS), and Galileo. The system 110 can be configured to receive location data from GNSS based on types of receivers that are on-board the system 110. For example, if the systems 110 is equipped with a GPS and a BDS receiver, the system 110 can receive location data from both GPS and BDS. As another example, if the system 110 is equipped with a GLONASS and a Galileo receiver, the system 110 can receive location data both from GLONASS and Galileo. In some embodiments, location data received from GNSS can include time information. This time information can include absolute time (e.g., GMT or UTC time) at which the location data is transmitted from GNSS. For example, location data provided by GPS can include time at which the location data is transmitted by GPS. Time information provided by various GNSS satellite networks can be used by the timestamp synchronization module 114 to timestamp various data associated with the system 110.

In some embodiments, the time keeping system 130 can comprise one or more computing devices (e.g., time servers) that keep track of time. For example, in some embodiments, the time keeping system 130 can include computing devices provided by National Institute of Standards and Technology (NIST). These computing devices can provide accurate time information in response to a request sent over the network 140. In some embodiments, the time keeping system 130 can comprise time servers maintained and operated by other entities such as internet service providers (ISPs). Many variations are possible. In some embodiments, the timestamp synchronization module 114 can synchronize time with the time keeping system 130 over the network 140 using network time protocol (NTP).

Figure 2:
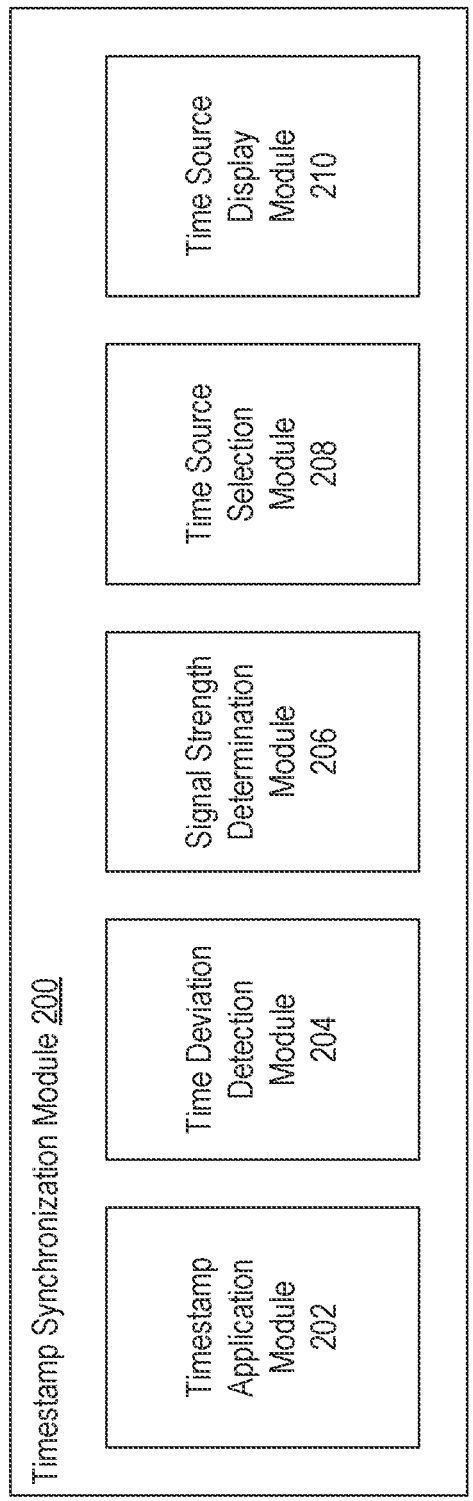
FIG. 2 illustrates an example timestamp synchronization module, in accordance with various embodiments of the present disclosure.

FIG. 2 illustrates an example timestamp synchronization module 200, in accordance with various embodiments of the present disclosure. In some embodiments, the timestamp synchronization module 114 of FIG. 1 can be implemented as the timestamp synchronization module 200. As shown in FIG. 2, in some embodiments, the timestamp synchronization module 200 can comprise a timestamp application module 202, a time deviation detection module 204, a signal strength determination module 206, a time source selection module 208, and a time source display module 210. Each of the modules 202, 204, 206, 208, and 210 will be discussed in detail below.

In some embodiments, the timestamp application module 202 can be configured to timestamp sensor data associated with a system such as a vehicle. The timestamp application module 202 can aggregate the sensor data and insert times at which the sensor data is aggregated. For example, the timestamp application module 202 can timestamp each frame of point cloud data acquire by a LiDAR sensor of a vehicle. As another example, the timestamp application module 202 can timestamp image data corresponding to each image frame captured by a camera of a vehicle. In some embodiments, the timestamp application module 202 can timestamp sensor data based on times embedded in location data provided by satellite signals. For example, the timestamp application module 202 can timestamp sensor data based on times embedded in location data received from GNSS (e.g., the location system 120 of FIG. 1). For instance, the timestamp application module 202 can timestamp acceleration or deceleration data recorded by an IMU with time embedded in location data provided by a GPS signal. As another instance, the timestamp application module 202 can timestamp object distance information captured by a radar with time embedded in location data provided by a BDS signal. In some embodiments, the timestamp application module 202 can timestamp sensor data based on times provided by time servers over a communication network. For example, the timestamp application module 202 can timestamp sensor data based on time provided by a NIST time server (e.g., the time keeping system 130 of FIG. 1) over an internet connection (e.g., the network 140 of FIG. 1). In some embodiments, the timestamp application module 202 can timestamp sensor data based on a local time source (e.g., the local time source 116 of FIG. 1). For example, the timestamp application module 202 can timestamp sensor data based on time provided by a computing device (e.g., data acquisition devices, communicate devices, data analysis devices, etc.) on-board a vehicle. Once the aggregated sensor data is timestamped, the timestamp application module 202 can store the aggregated timestamped data to at least one datastore (e.g., the one or more datastores 118 of FIG. 1) for later access.

In some embodiments, the timestamp application module 202 can timestamp sensor data based on a hierarchy of time sources. In general, times embedded in location data provided by GNSS signals tends to be most accurate and precise to absolute time (e.g., GMT, UTC, etc.) kept by NIST or other national or scientific entities or institutions. Therefore, whenever location data provided by a GNSS signal is available and the GNSS signal is above a threshold signal strength value, the timestamp application module 202 will timestamp sensor data based on time embedded in the GNSS signal. When a GNSS signal becomes weak or otherwise becomes unavailable, the timestamp application module 202 will be programmed to automatically transition to timestamp sensor data based on time acquired from a time server over an internet connection. When both the satellite signal becomes weak or otherwise becomes unavailable, and the internet connection becomes weak or unresponsive, the timestamp application module 202 will be programmed to automatically transition to timestamp sensor data based on time kept by an on-board computing device. Unlike times embedded in GNSS signals or time provided by a time server, time kept by the no-board computing device may run fast or slow (e.g., out of synchronization with time maintained by NIST) over some period of time. Thus, timestamping sensor data based on the time kept by the on-board computing device may lack accuracy and precision needed for the sensor data to be aggregated for data integration purposes (e.g., storage into the datastore).

In some embodiments, the timestamp application module 202 may utilize a machine learning model to determine whether or not to utilize times embedded in GNSS signals to timestamp sensor data. Machine learning criteria associated with the machine learning model may include a frequency at which a GNSS signal is received, a stability of a GNSS signal, and/or current environmental conditions. For example, if a frequency and/or a stability of a satellite signal exceeds one or more respective thresholds, then time embedded in the satellite signal may be utilized to timestamp sensor data. The stability of the GNSS signal may be determined based on a signal strength and/or a consistency of the signal strength of the GNSS signal over time. The machine learning criteria may additionally or alternatively include a strength and/or a stability of an internet connection. The machine learning criteria may additionally or alternatively take into account historical data, such as actions previously performed or determinations previously made at a particular region or location. For example, if, at a particular location, time embedded in a GNSS signal was previously successful in timestamping sensor data, the machine learning model may determine to utilize the time embedded in the GNSS signal again to timestamp the sensor data.

In some embodiments, the time deviation detection module 204 can be configured to detect a time deviation between different GNSS signals based on location data provided by the different GNSS signals. For example, the time deviation detection module 204 can extract time embedded in location data provided by a GPS signal and time embedded in location data provided by a BDS signal. The time deviation detection module 204, in this example, can compare the two times and determine whether the two times are within a time threshold. If the two times are determined not to be within the time threshold, a time deviation manifests and, in response, the time deviation detection module 204 can flag this time deviation to the signal strength determination module 206 for further action. In one implementation, the time threshold may be 1 second. In another implementation, the time threshold may be 1 milli-second. Many variations are possible. In general, the time threshold appropriate for determining the time deviation can be user adjustable. In the discussion above, the time deviation detection module 204 is discussed in reference to determining a time deviation between two GNSS signals. In some embodiments, the time deviation detection module 204 can also determine a time deviation based on three or four different GNSS signals. For example, the time deviation detection module 204 can be configured to detect a time deviation by computing and comparing one or more time differences based on times embedded in location data provided by a GPS signal, a BDS signal, and a GLONASS signal (and/or a Galileo signal). In this example, if any one of the one or more time differences is determined to exceed the time threshold, the time deviation detection module 204 will flag or indicate this difference as a time deviation.

In some embodiments, the signal strength determination module 206 can be configured to determine signal strengths of GNSS signals. The signal strength determination module 206 can determine the signal strengths of the GNSS signals in response to the time deviation detection module 204 flagging or indicating a time deviation. For example, in response to the time deviation detection module 204 flagging a time deviation between a GPS signal and a BDS signal, the signal strength determination module 206 can determine signal strengths of the GPS signal and the BDS signal. As another example, in response to the time deviation detection module 204 flagging or indicating a time deviation between a GPS signal, a BDS signal, a GLONASS signal, and a Galileo signal, the signal strength determination module 206 can determine signal strengths of the GPS signal, BDS signal, the GLONASS signal, and the Galileo signal.

In some embodiments, the time source selection module 208 can be configured to select a time source with which the timestamp application module 202 can use to timestamp sensor data of an autonomous vehicle. The time source selection module 208 can selects a time source in response to the time deviation detection module 104 detecting a time deviation. In some embodiments, the time source selection module 208 can select a time source based on a ranking of signal strengths of GNSS signals. For example, in response to a time deviation determined based on GNSS signals, the time source selection module 208 can rank the GNSS signals based on their respective signal strengths as determined by the signal strength determination module 206. In this example, the time source selection module 208 selects a GNSS signal with a highest signal strength to be the time source with which the timestamp application module 202 can use to timestamp sensor data. For example, if a BDS signal has the highest signal strength among the GNSS signals, the time source selection module 208 will select the BDS signal as the time source with which to timestamp sensor data. In some embodiments, the time source selection module 208 can select a time source based on signal strengths exceeding a threshold signal strength value. For example, the time source selection module 208 can select a time source based on a GNSS signal that exceeds −166 dBW (e.g., a threshold signal strength value). In this example, if a GNSS signal falls below −166 dBW, that GNSS signal is deemed be to too weak to reliably be used as a time source for the timestamp application module 202 to timestamp sensor data. In such cases, other GNSS signals that exceed −166 dBW may be used as time sources to timestamp sensor data. In some embodiments, when none of the GNSS signals exceeds the threshold signal strength value and a network connection to a time server (e.g., the time keeping system 130 of FIG. 1) is above a certain threshold number of signal bars (e.g., cellular signal strength), the time source selection module 208 may select the time server as the time source with which to timestamp sensor data. In some embodiments, when both the GNSS signals and the network connection become poor or are below their respective thresholds, the time source selection module 208 may select a local time source as the time source with which to timestamp sensor data. In some embodiments, the local time source may correspond to an internal clock maintained or managed by a local computing device on-board an autonomous vehicle. In some cases, the local time source may be battery-powered clock such that when power is taken away, the battery-power clock remains operational.

In some embodiments, the time source display module 210 can provide various timestamp synchronization information for a user of a system such as an occupant of an autonomous vehicle. In some embodiments, the time source display module 210 can provide the timestamp synchronization information on a display screen, such as a screen of an infotainment device or a screen of a computing device, associated with the autonomous vehicle. In some embodiments, the time source display module 210 can provide various time sources with which the timestamp application module 202 can use to timestamp sensor data. For example, the time source display module 210 can display times embedded in location data provided by GNSS signals, one or more times corresponding to one or more time servers, and one or more times of local computing devices on a display screen inside an autonomous vehicle. In some embodiments, the time source display module 210 can provide signal strengths of the GNSS signals. For example, the time source display module 210 can display signal strengths of GPS, BDS, GLONASS, and Galileo signals. In some embodiments, the time source display module 210 can indicate a time deviation between the times embedded in the location data provided by the GNSS signals. In such embodiments, the time source display module 210 can further indicate a time source associated with the GNSS signals with which sensor data is timestamped. In some embodiment, the time source display module 210 can indicated a communication network connection and a signal strength of the communication network connection with which a time server may be accessed. The time source display module 210 will be discussed in further detail in reference to FIG. 3 herein.

Figure 3:
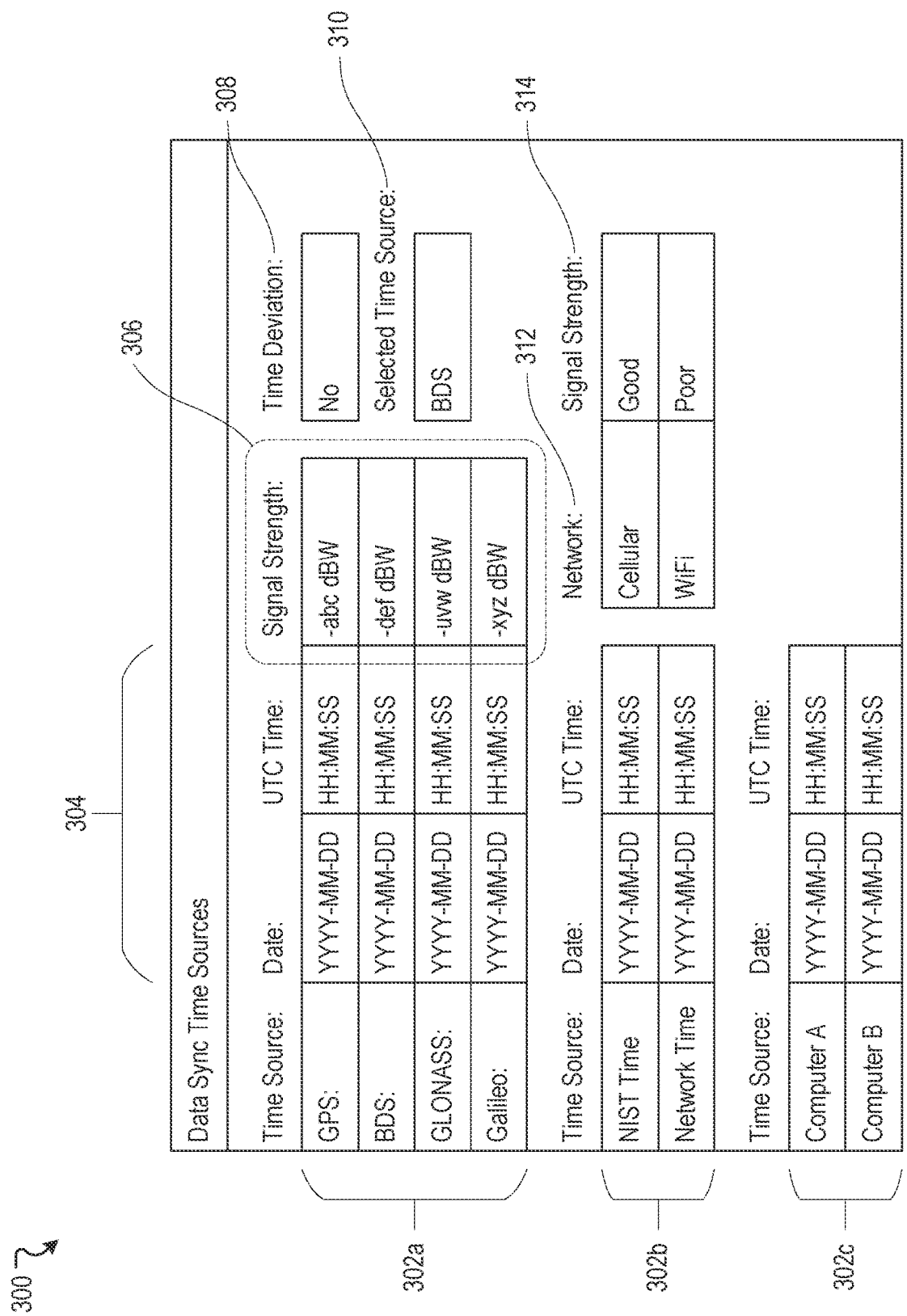
FIG. 3 illustrates an example user interface, in accordance with various embodiments of the present disclosure.

FIG. 3 illustrates an example user interface 300, in accordance with various embodiments of the present disclosure. In some embodiments, the user interface 300 can be implemented as an interface pane of a plurality of interface panes of a computing device associated with an autonomous vehicle. In some embodiments, the user interface 300 can be implemented on a computing system remote from the autonomous vehicle. In such embodiments, the computing system and the autonomous vehicle can communicate over a wireless network such as a cellular or Wi-Fi network. As shown in FIG. 3, the user interface 300 can include a plurality of time source groups 302a, 302b, and 302c. The time source group 302a can include time sources corresponding to GNSS. For example, as shown in FIG. 3, the time source group 302a includes GPS, BDS, GLONASS, and Galileo. The time source group 302b can include time sources corresponding to time servers. For example, as shown in FIG. 3, the time source group 302b includes time servers provided by NIST ("NIST Time") and an internet service provider ("Network Time"). The time source group 302c can include times provided by local computing devices ("Computer A" and "Computer B") on-board the autonomous vehicle. The user interface 300 can further include fields for dates and UTC times reported by each time source. In one implementation, as shown in FIG. 3, the dates and the UTC times reported by each time source can be provided in YYYY-MM-DD and HH:MM:SS formats, respectively. In other implementations, the dates and the UTC times may be reported in other formats such as in MM-DD-YY and AM/PM formats, respectively. Many variations are possible. In general, the dates and the UTC times of the user interface 300 can be configured or adapted to reflect date and time formats of local geographical customs.

In some embodiments, for the time source group 302a, the user interface 300 can further include information relating to signal strengths 306 associated with GNSS signals. For example, as shown in FIG. 3, signal strengths of GPS, BDS, GLONASS, and Galileo signals can be displayed in the user interface 300. The user interface 300 can additional provide an indication 308 of a time deviation when the time deviation occurs between the GNSS signals and an indication 310 of a time source with which sensor data of the autonomous vehicle is timestamped. In some embodiments, for the time source group 302b, the user interface 300 can further include information relating to network types 312 and network signal strengths 314 associated with communication networks on which the time servers are accessed. For example, as shown in FIG. 3, the user interface 300 can include network types of Wi-Fi (e.g., IEEE 802.11b) and cellular (e.g., 3G or 4G cellular connections) and their respective signal strengths. In some embodiments, the user interface 300 may also include data indicating GNSS signal strengths and network signal strengths over a period of time and/or within a particular region. For example, the period of time may include a period of a day, a week, a month, or a year. Current, instantaneous, or most recent signal strength of a GNSS signal such as a GPS signal, a BDS signal, a GLONASS signal, or a Galileo signal may be evaluated based on a comparison to its historical signal strength, which may be a mean or median signal strength measured over the period of time. If the most recent signal strength of the GNSS signal deviates from the historical signal strength, the signal strength of the GNSS signal may be evaluated to be poor. As discussed above, when the GNSS signals are poor (e.g., less than a threshold signal strength value) or become non-existent while a connection to the communication networks is good, time with which sensor data is timestamped can be automatically transitioned to be based on time reported by a time server. In such cases, the indication 310 of the time source would indicate the time server as the selected time source. When both the GNSS signals and the connection to the communication networks are poor, time with which sensor data is timestamped can be automatically transitioned to be based on time maintained by a local computing device. In such cases, the indication 310 of the time source would indicate the local computing device as the selected time source.

Figure 4:
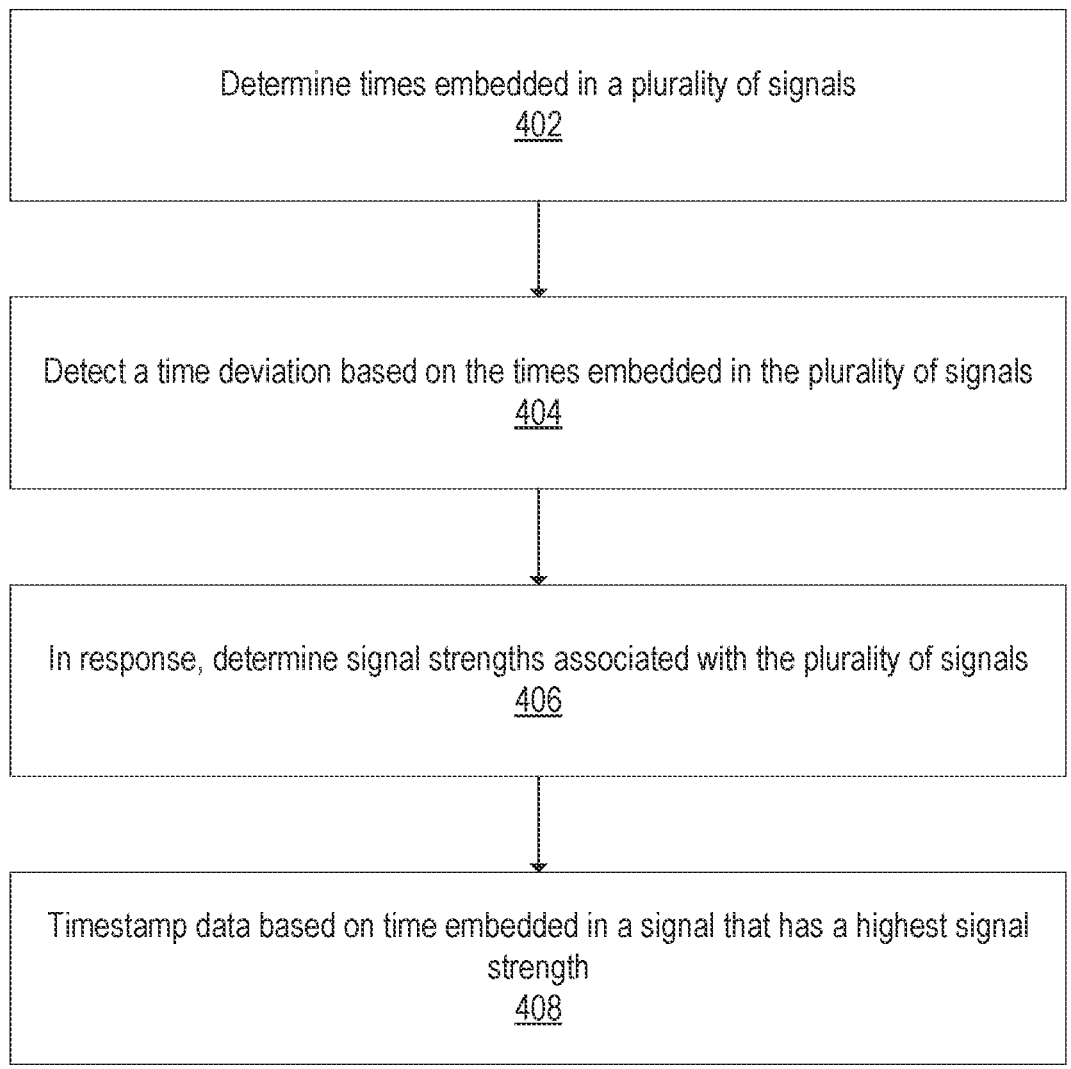
FIG. 4 illustrates a flowchart of a method, in accordance with various embodiments of the present disclosure.

FIG. 4 illustrates a flowchart of a method 400, in accordance with various embodiments of the present disclosure. In this and other flowcharts, the method 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGURES may also be applicable to FIG. 4.

In step 402, a processor such as a timestamp synchronization module can determine times embedded in a plurality of signals. In step 404, the processor can detect a time deviation based on the times embedded in the plurality of signals. In step 406, the processor can, in response, determine signal strengths associated with the plurality of signals. In step 408, a processor such as a timestamp synchronization module can timestamp data based on time embedded a signal that has a highest signal strength.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
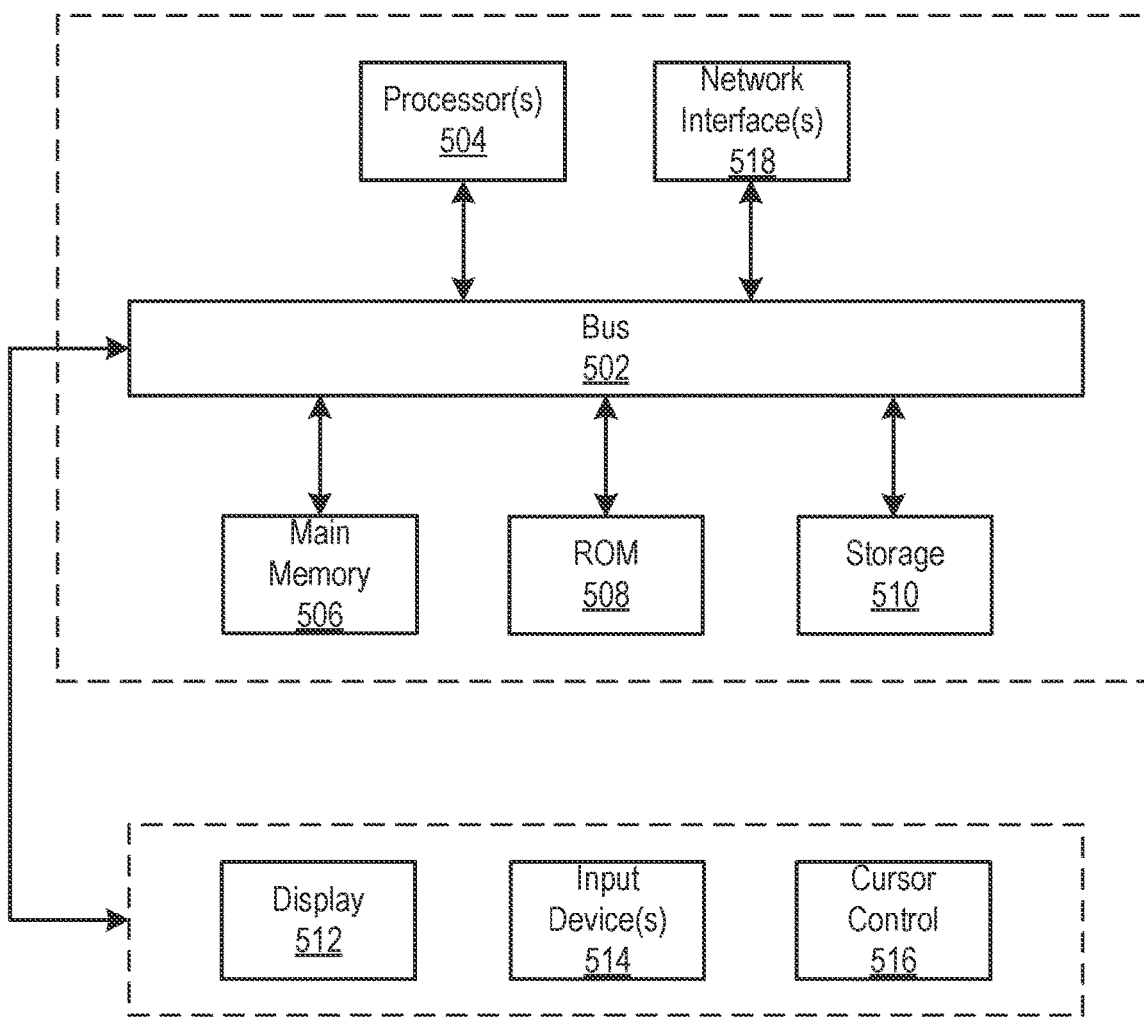
FIG. 5 is a block diagram that illustrates a computer system upon which any of embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. A description that a device performs a task is intended to mean that one or more of the hardware processor(s) 504 performs.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computer-implemented method comprising:
   determining, by a computing system on-board a vehicle, times embedded in a plurality of global navigation satellite system (GNSS) signals;
   detecting, by the computing system, time deviations among the times embedded in the respective different GNSS signals;
   determining, by the computing system, in response to detecting the time deviations, signal strengths associated with the plurality of GNSS signals, wherein each different GNSS signal corresponds to a different time embedded in location data of the each GNSS signal; and
   timestamping, by the computing system, data based on time embedded in a GNSS signal that has a highest signal strength, and in response to:
      a frequency at which the GNSS signal is received exceeding a threshold frequency, and
      a consistency of signal strength of the GNSS signal exceeding a threshold signal strength.

2. The computer-implemented method of claim 1, wherein the-vehicle is an autonomous vehicle or a semi-autonomous vehicle and the data is sensor data associated with the autonomous vehicle or the semi-autonomous vehicle.

3. The computer-implemented method of claim 2, wherein the sensor data associated with the vehicle includes at least one of point cloud data from a light detection and ranging (LiDAR) sensor, image data from one or more cameras, object distance data from one or more radars, or acceleration and gyroscopic data from an inertial measurement unit.

4. The computer-implemented method claim 1, wherein the plurality of GNSS signals comprise one or more of: a global positioning system (GPS) signal, a BeiDou Navigation Satellite System (BDS) signal, a Global Navigation Satellite System (GLONASS) signal, or a Galileo signal.

5. The computer-implemented method of claim 1, wherein detecting the time deviations based on the times embedded in the plurality of GNSS signals comprises:
   computing one or more time differences between the times embedded in the plurality of GNSS signals;
   comparing the one or more time differences to a time threshold; and
   determining the time deviations based on at least one of the one or more time differences exceeding the time threshold.

6. The computer-implemented method of claim 1, further comprising:
   providing, by the computing system, an indication of the time deviations through a user interface; and
   providing, by the computing system, through the user interface, an indication of a GNSS signal that is used to timestamp the data.

7. The computer-implemented method of claim 1, wherein the GNSS signal that has the highest signal strength exceeds a threshold signal strength value.

8. The computer-implemented method of claim 7, further comprising:
   timestamping, by the computing system, in response to the GNSS signal that has the highest signal strength not exceeding the threshold signal strength value, the data with time provided by a time server, the time provided by the time server being from a non-GNSS source.

9. The computer-implemented method of claim 8, wherein the time provided by the time server is accessible by the computing system over a communication network.

10. The computer-implemented method of claim 9, further comprising:
    timestamping, by the computing system, in response to the communication network becoming unavailable, the data with time provided by a local computing device, wherein the local computing device is part of the computing system.

11. A system on-board a vehicle comprising:
    at least one processor; and
    a memory storing instructions that, when executed by the at least one processor, cause the system to perform a method comprising:
       determining times embedded in a plurality of global navigation satellite system (GNSS) signals;
       detecting time deviations among the times embedded in the respective different GNSS signals, wherein each different GNSS signal corresponds to a different time embedded in location data of the each different GNSS signal;
       determining, in response to detecting the time deviations, signal strengths associated with the plurality of GNSS signals; and
       timestamping, by the computing system, data based on time embedded in a GNSS signal that has a highest signal strength, and in response to:
          a frequency at which the GNSS signal is received exceeding a threshold frequency, and
          a consistency of signal strength of the GNSS signal exceeding a threshold signal strength.

12. The system of claim 11, wherein the GNSS signal that has the highest signal strength exceeds a threshold signal strength value.

13. The system of claim 12, wherein the instructions, when executed, cause the system to further perform:
   timestamping, in response to the signal that has the highest signal strength not exceeding the threshold signal value, the data with time provided by a time server, the time provided by the time server being from a non-GNSS source.

14. The system of claim 13, wherein the time provided by the time server is accessible over a communication network.

15. The system of claim 14, wherein the instructions, when executed, cause the system to further perform:
   timestamping, in response to the communication network becoming unavailable, the data with time provided by a local computing device, wherein the local computing device is part of the system.

16. A non-transitory memory storing instructions that, when executed by at least one processor of a computing system, cause the computing system to perform a method comprising:
   determining times embedded in a plurality of global navigation satellite system (GNSS) signals;
   detecting time deviations among the times embedded in the respective different GNSS signals, wherein each different GNSS signal corresponds to a different time embedded in location data of the each different GNSS signal;
   determining, in response to detecting the time deviations, signal strengths associated with the plurality of GNSS signals; and
   timestamping, by the computing system, data based on time embedded in a GNSS signal that has a highest signal strength, and in response to:
      a frequency at which the GNSS signal is received exceeding a threshold frequency, and
      a consistency of signal strength of the GNSS signal exceeding a threshold signal strength.

17. The non-transitory memory of claim 16, wherein the GNSS signal that has the highest signal strength exceeds a threshold signal strength value.

18. The non-transitory memory of claim 17, wherein the instructions, when executed, cause the computing system to further perform:
   timestamping, in response to the signal that has the highest signal strength not exceeding the threshold signal value, the data with time provided by a time server, the time provided by the time server being from a non-GNSS source.

19. The non-transitory memory of claim 16, wherein the instructions, when executed, cause the computing system to further perform:
   timestamping, in response to a communication network becoming unavailable, the data with time provided by a local computing device, wherein the local computing device is part of the computing system.

\* \* \* \* \*